(12) United States Patent  
Iwafuchi et al.

(10) Patent No.: US 9,123,150 B2  
(45) Date of Patent: Sep. 1, 2015

(54) IMAGE PROCESSING APPARATUS, COLOR ADJUSTMENT SYSTEM, AND NON-TRANSITORY COMPUTER READABLE MEDIUM

(71) Applicant: FUJI XEROX CO., LTD., Tokyo (JP)

(72) Inventors: Toshihiro Iwafuchi, Yokohama (JP); Kazuhiko Horikawa, Yokohama (JP); Noriko Sakai, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 125 days.

(21) Appl. No.: 14/086,584

(22) Filed: Nov. 21, 2013

(65) Prior Publication Data

US 2014/0362106 A1   Dec. 11, 2014

(30) Foreign Application Priority Data

Jun. 7, 2013   (JP) ................................. 2013-121108

(51) Int. Cl.
```
G09G 5/00      (2006.01)
G09G 3/30      (2006.01)
G09G 5/10      (2006.01)
H04N 17/00     (2006.01)
H04N 5/202     (2006.01)
H04N 5/46      (2006.01)
H04N 9/73      (2006.01)
H04N 5/57      (2006.01)
G03F 3/08      (2006.01)
G06K 9/00      (2006.01)
G06K 9/40      (2006.01)
G06T 11/00     (2006.01)
G09G 5/02      (2006.01)
H04N 1/60      (2006.01)
H04N 9/64      (2006.01)
```
(52) U.S. Cl.  
CPC .............. *G06T 11/001* (2013.01); *G09G 5/02* (2013.01); *H04N 1/6058* (2013.01); *G09G 2320/0276* (2013.01); *H04N 9/646* (2013.01)

(58) Field of Classification Search  
CPC combination set(s) only.  
See application file for complete search history.

(56) References Cited

U.S. PATENT DOCUMENTS

| | | | |
|---|---|---|---|
| 6,850,214 B2* | 2/2005 | Nishitani et al. | 345/87 |
| 7,057,766 B1* | 6/2006 | Inoue | 358/1.9 |
| 2002/0011795 A1* | 1/2002 | Shinohara | 315/169.1 |
| 2005/0068503 A1* | 3/2005 | Imade | 353/31 |

(Continued)

FOREIGN PATENT DOCUMENTS

| | | |
|---|---|---|
| JP | A-11-296149 | 10/1999 |
| JP | A-2005-128254 | 5/2005 |

*Primary Examiner* — Wesner Sajous  
(74) *Attorney, Agent, or Firm* — Oliff PLC

(57) ABSTRACT

An image processing apparatus includes an image information transmitting unit, a color information acquiring unit, a gradation characteristic determination unit, and a change instruction output unit. The image information transmitting unit transmits, to a display device, pieces of information corresponding to color measurement images. The color information acquiring unit acquires pieces of color information of images displayed on the display device on the basis of the transmitted pieces of information. The gradation characteristic determination unit determines, on the basis of the acquired pieces of color information, whether or not a setting of color adjustment that is performed in the display device satisfies a predetermined gradation characteristic. The change instruction output unit outputs an instruction to change the setting of color adjustment in the case where the gradation characteristic determination unit determines that the setting of color adjustment does not satisfy the predetermined gradation characteristic.

13 Claims, 16 Drawing Sheets

(56) References Cited

U.S. PATENT DOCUMENTS

| | | | |
|---|---|---|---|
| 2005/0168490 A1* | 8/2005 | Takahara | 345/690 |
| 2007/0030525 A1* | 2/2007 | Ono | 358/406 |
| 2007/0146266 A1 | 6/2007 | Yasuda et al. | |
| 2009/0189924 A1* | 7/2009 | Ogura | 345/690 |

* cited by examiner

FIG. 12B

| | COLOR TEMPERATURE (K) | COLOR TEMPERATURE DIFFERENCE | COLOR TEMPERATURE WEIGHT | COLOR TEMPERATURE SCORE | GRADATION DIFFERENCE | GRADATION WEIGHT | GRADATION SCORE | TOTAL SCORE | ADOPTED |
|---|---|---|---|---|---|---|---|---|---|
| TARGET | 6500 | | | | | | | | |
| SETTING A | 5500 | 1000 | 1/100 | 10 | 0.2 | 100 | 20 | 30 | YES |
| SETTING B | 6000 | 500 | 1/100 | 5 | 0.4 | 100 | 40 | 45 | NO |

IMAGE PROCESSING APPARATUS, COLOR ADJUSTMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-121108 filed Jun. 7, 2013.

BACKGROUND

Technical Field

The present invention relates to an image processing apparatus, a color adjustment system, and a non-transitory computer readable medium.

SUMMARY

According to an aspect of the invention, there is provided an image processing apparatus including an image information transmitting unit, a color information acquiring unit, a gradation characteristic determination unit, and a change instruction output unit. The image information transmitting unit transmits, to a display device, pieces of information corresponding to color measurement images that are used for performing color adjustment for the display device. The color information acquiring unit acquires pieces of color information of images displayed on the display device on the basis of the pieces of information corresponding to the color measurement images, which have been transmitted by the image information transmitting unit. The gradation characteristic determination unit determines, on the basis of the pieces of color information that have been acquired by the color information acquiring unit, whether or not a setting of color adjustment that is performed in the display device satisfies a predetermined gradation characteristic. The change instruction output unit outputs an instruction to change the setting of color adjustment that is performed in the display device in the case where the gradation characteristic determination unit determines that the setting of color adjustment that is performed in the display device does not satisfy the predetermined gradation characteristic.

BRIEF DESCRIPTION OF THE DRAWINGS

Exemplary embodiments of the present invention will be described in detail based on the following figures, wherein:

FIGS. 12A and 12B illustrate a sixth example of the method for determining the gradation characteristic of the display device;

DETAILED DESCRIPTION

Description of Overall Configuration of Image Display System

Exemplary embodiments of the present invention will be described below in detail with reference to the accompanying drawings.

Figure 1:
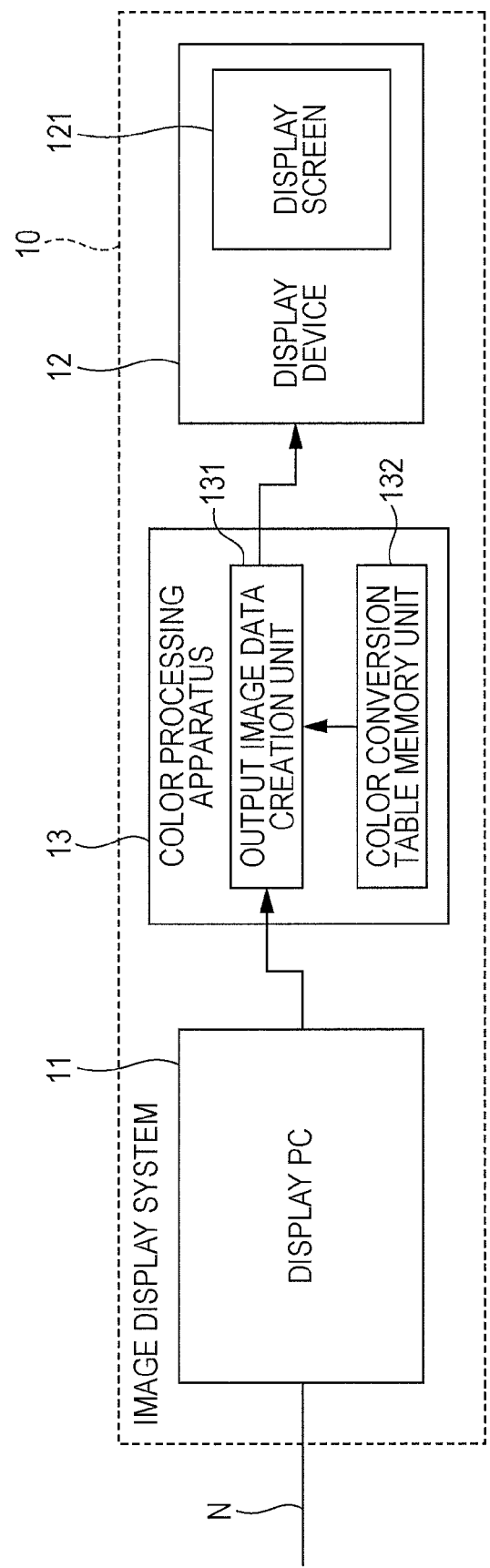
FIG. 1 is a diagram illustrating an example of the configuration of an image display system according to an exemplary embodiment.

FIG. 1 is a diagram illustrating an example of the configuration of an image display system 10 according to an exemplary embodiment.

The image display system 10 includes a display personal computer (PC) 11 that is connected to a network N and performs processing, such as creation of image information (input image data) used for display, a display device 12 that displays an image on a display screen 121, and a color processing apparatus 13, which is one example of a color conversion unit, which performs color conversion processing on the input image data received from the display PC 11 by using a color conversion table (conversion relationship) and outputs the resulting image data (output image data for display) to the display device 12. The image display system 10 is connected to another image display system, various printers, or the like over the network N.

In the image display system 10, the display PC 11 and the color processing apparatus 13 are connected to each other via Digital Visual Interface (DVI) and the color processing apparatus 13 and the display device 12 are connected to each other also via DVI. Note that such connections may be made via High-Definition Multimedia Interface (HDMI™) or DisplayPort instead of DVI.

The display PC 11 is a general-purpose PC. The display PC 11 is configured to perform processing, such as creation of input image data, by running various kinds of application software under the control of an operating system (OS).

The display device 12 is a device, such as a liquid crystal display for a PC, a liquid crystal television, or a projector, which has a function of displaying an image through an additive process. Therefore, the display system used in the display device 12 is not limited to liquid crystal systems. Note that, in the example illustrated in FIG. 1, the display screen 121 is included in the display device 12. In the case where a projector is used as the display device 12, for example, the display screen 121 may be a screen or the like provided outside the display device 12.

The color processing apparatus 13 includes an output image data creation unit 131 and a color conversion table memory unit 132.

The output image data creation unit 131 performs color conversion on the input image data received from the display PC 11 by using a color conversion table read from the color conversion table memory unit 132 and outputs the resulting output image data for display to the display device 12.

The color conversion table memory unit 132 stores a color conversion table that is used in creation of output image data for display performed by the output image data creation unit 131 described above. Examples of the color conversion table include a matrix for conversion, a one-dimensional lookup table (LUT), and a multi-dimensional LUT. In this exemplary embodiment, a multi-dimensional LUT is used in order to perform color conversion more accurately. Note that the color conversion table memory unit 132 is a nonvolatile memory (such as a flash memory) that is readable/writable and capable of retaining stored contents without power feeding.

FIG. 1 illustrates the image display system 10 in which one display device 12 is connected to one display PC 11 via one color processing apparatus 13, however, the configuration of the image display system 10 is not limited to that illustrated in FIG. 1. For example, a multi-monitor configuration may be used in which plural display devices 12 are connected to one color processing apparatus 13 and different continuous images are displayed on the respective display devices 12.

In the image display system 10 according to this exemplary embodiment, it is not the display PC 11 but the color processing apparatus 13 that performs color conversion processing on input image data and creates output image data for display. A color conversion table used in color conversion processing that is performed in the color processing apparatus 13 is created by taking into consideration, for example, the device characteristic of the display device 12 and the device characteristics of another image display system, a printer, or the like connected to the image display system 10 over the network N, so as to make the colors represented on the image display system 10 illustrated in FIG. 1 and the colors represented on another image display system, a printer, or the like match with each other. In the image display system 10, a color conversion table is created by taking into consideration the device characteristic of the display device 12 while a color setting system described below is externally connected to the image display system 10.

Next, the color setting system connected to the image display system 10 for creating a color conversion table that is used by the color processing apparatus 13 is described.

Figure 2:
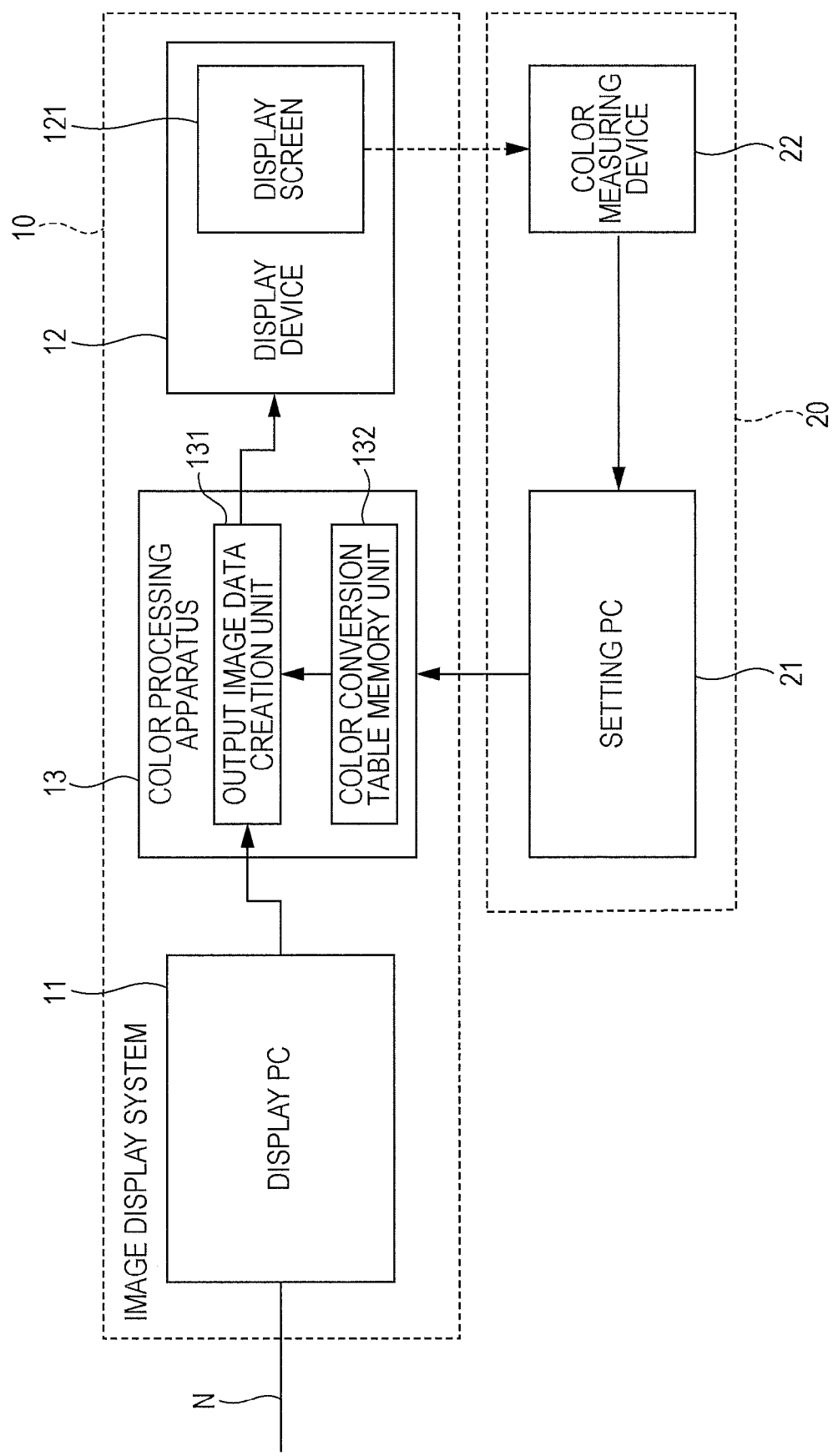
FIG. 2 is a diagram illustrating a state in which a color setting system is connected to the image display system illustrated in FIG. 1.

FIG. 2 is a diagram illustrating a state in which a color setting system 20 is connected to the image display system 10 illustrated in FIG. 1.

The color setting system 20 according to this exemplary embodiment includes a setting PC 21 that is connected to the color processing apparatus 13 in the image display system 10 and a color measuring device 22 that is connected to the setting PC 21 and measures the colors of an image displayed on the display screen 121 of the display device 12 in the image display system 10.

In the color setting system 20, the setting PC 21 and the color measuring device 22 are connected to each other via Universal Serial Bus (USB) or an interface based on Recommended Standard 232 version C (RS-232C). The setting PC 21 in the color setting system 20 and the color processing apparatus 13 in the image display system 10 are connected to each other via USB.

The setting PC 21 in the color setting system 20, which is described below in detail, is a general-purpose PC and may be a notebook PC or the like that is excellent in portability. The setting PC 21 is also configured to run various kinds of application software under the control of an OS.

The color measuring device 22 includes a sensor that is disposed in contact with or in no contact with the display screen 121 of the display device 12 in the image display system 10 and measures the colors of an image displayed on the display screen 121. In this example, the measuring area of the sensor provided in the color measuring device 22 is set to be equal to or smaller in size than the display screen 121. The color measuring device 22 is configured to measure the colors of a predetermined portion in the entire area of the display screen 121, not the colors of the entire area.

FIG. 2 illustrates the color setting system 20 in which one color measuring device 22 is connected to one setting PC 21, however, the configuration of the color setting system 20 is not limited to that illustrated in FIG. 2. For example, the configuration may be such that plural color measuring devices 22 are connected to one setting PC 21.

In this exemplary embodiment, the setting PC 21 provided in the color setting system 20 is allowed to create a color conversion table and write the color conversion table in the color conversion table memory unit 132 of the color processing apparatus 13 in the image display system 10. In this exemplary embodiment, the setting PC 21 may be regarded as a conversion relationship creation unit (image processing apparatus) that creates a color conversion table used in the color processing apparatus 13.

Usually, the image display system 10 according to this exemplary embodiment is configured to display, on the display screen 121 of the display device 12, an image (display image) based on output image data for display, which is obtained as a result of color conversion performed by the color processing apparatus 13 on input image data that has been created by the display PC 11, while the color setting system 20 is disconnected from the image display system 10. In the case where creation, modification, or the like of a color conversion table is performed, the image display system 10 is configured to display, on the display screen 121 of the display device 12, color measurement images (color patches) that have been selected by the setting PC 21, while the color setting system 20 is connected to the image display system 10.

As described above, color measurement images are displayed on the display screen 121 of the display device 12 in order to create a color conversion table that is used for performing color conversion processing for the display device 12. The displayed color measurement images are measured by the color measuring device 22 and the setting PC 21 creates a color conversion table on the basis of pieces of color data that have been outputted from the color measuring device 22. The color conversion table is stored in the color conversion table memory unit 132 of the color processing apparatus 13 and the output image data creation unit 131 performs color conversion to thereby perform color adjustment. This color adjustment using a color conversion table may be hereinafter referred to as "software adjustment" in this exemplary embodiment.

On the other hand, the display device 12 usually has a function of performing color adjustment. That is, the display device 12 is capable of performing color adjustment by itself by using the color adjustment function. This color adjustment may be performed by a user pressing a "Menu" button provided on the display device 12, selecting each item for color adjustment displayed on the display screen 121 of the display device 12, and operating a "+(plus)" button or a "−(minus)" button provided on the display device 12 for each item. The items for color adjustment include "brightness", "contrast", "gain", "offset", "color temperature", "preset mode", and the like. The color adjustment performed in the display device 12 may be hereinafter referred to as "hardware adjustment" in this exemplary embodiment.

When performing hardware adjustment, a user selects an item for color adjustment in accordance with the purpose of the color adjustment. For example, in the case where a user desires to adjust the brightness of the display device 12, a user is able to adjust the brightness by selecting "brightness" from among the items described above, however, a user may select "contrast" in order to adjust the brightness. In the case where a user desires to adjust the color temperature of the display device 12, a user is able to adjust the color temperature by selecting "color temperature" from among the items described above, however, a user may select "gain" in order to adjust the color temperature.

Hardware adjustment has a merit in that there is only a relatively small impact on the gradation characteristic after color adjustment, but has a drawback in that the settable range is narrow and fine color adjustment is difficult.

Note that the gradation characteristic may be degraded in the case where the input values of respective colors of red (R), green (G), and blue (B) are close to 0 or close to the maximum value (for example, 255 in the case of 8-bit (256 gradations)).

Figure 3A:
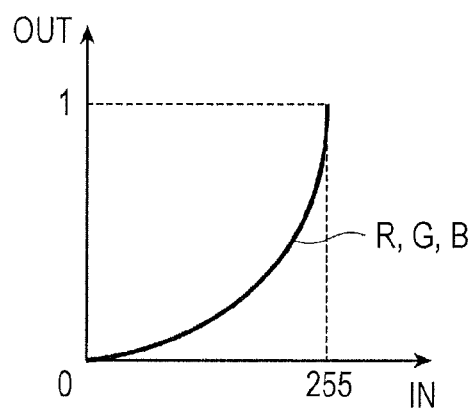
FIGS. 3A and 3B are diagrams illustrating changes in gradation characteristics when color adjustment is performed through hardware adjustment.
Figure 3B:
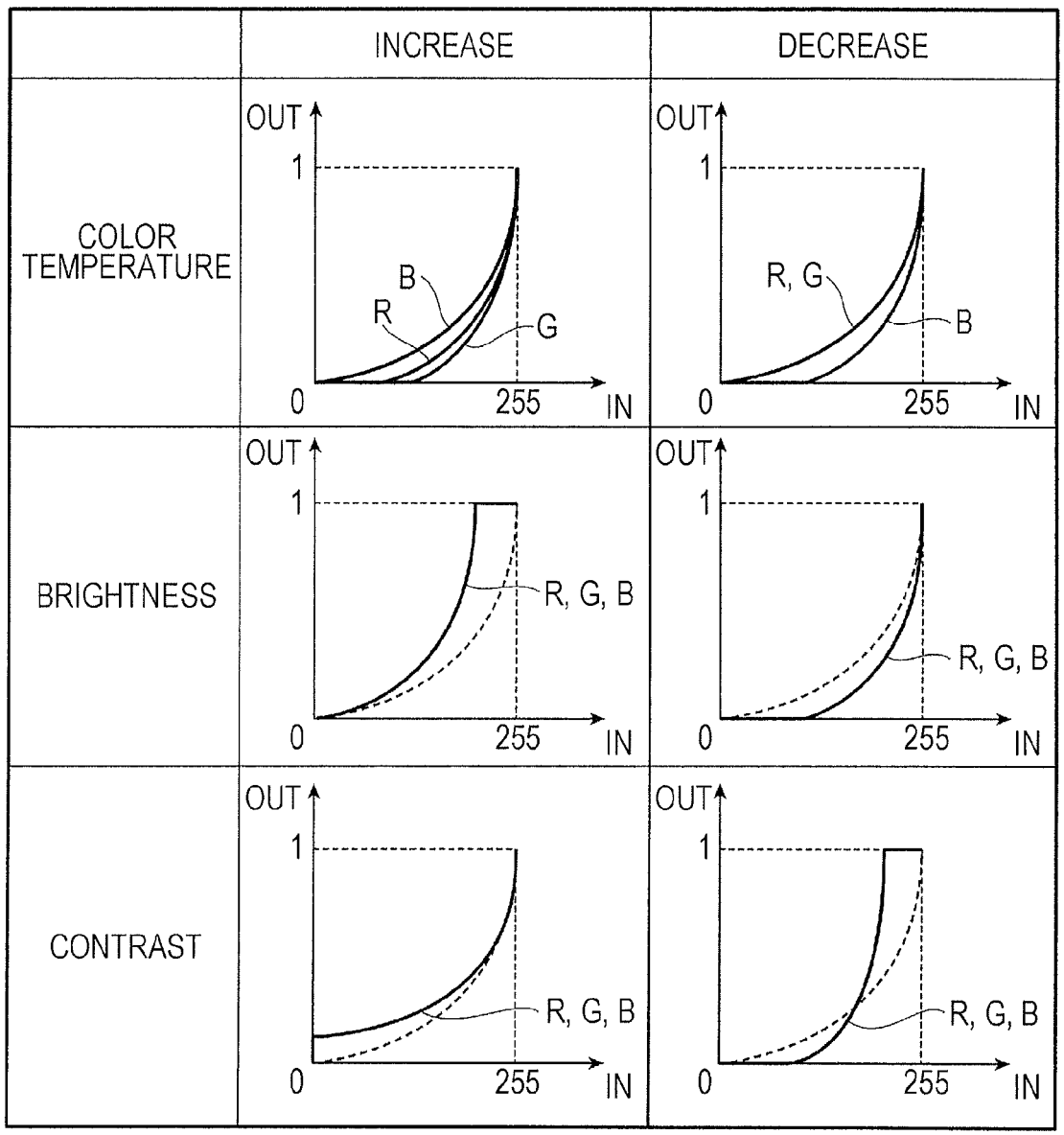

FIGS. 3A and 3B are diagrams illustrating changes in gradation characteristics when color adjustment is performed through hardware adjustment. In FIGS. 3A and 3B, the horizontal axis represents an input value, which is an integer ranging from 0 to 255 in this exemplary embodiment. The vertical axis represents an output value, which is obtained by normalizing the lightness of an image actually displayed on the display screen 121 of the display device 12 while supposing that the maximum value is 1.

FIG. 3A illustrates the gradation characteristics of respective colors of R, G, and B before color adjustment through hardware adjustment is performed. As illustrated in FIG. 3A, the gradation characteristics of respective colors of R, G, and B are substantially the same in this case. The gradation characteristics represented by using, for example, the γ (gamma) value are γ=2.2.

FIG. 3B illustrates changes in the gradation characteristics of respective colors of R, G, and B when "increase" setting and "decrease" setting are performed as hardware adjustment on each of the color temperature, brightness, and contrast. Note that, as described above, "color temperature" is not necessarily selected from among the items for color adjustment in the case of adjusting the color temperature. The same applies to the brightness and contrast.

The case of color temperature in FIG. 3B is described first. When setting is performed so as to increase the color temperature, the gradation characteristic of B remains substantially unchanged, however, the gradation curves of R and G move further toward the lower side in the diagram than the gradation curve of B. That is, the gradation characteristics of R and G represented by using, for example, the γ value are γ<2.2.

In contrast, when setting is performed so as to decrease the color temperature, the gradation characteristics of R and G remain substantially unchanged, however, the gradation curve of B moves further toward the lower side in the diagram than the gradation curves of R and G. That is, the gradation characteristic of B represented by using, for example, the γ value is γ<2.2.

In the case where a gradation curve moves toward the lower side, the number of gradations associated with the output value is substantially decreased in the range in which the input values are small. Accordingly, loss of gradations tends to occur in a displayed image in an area in which the input values are small.

Next, in the case of brightness, when setting is performed so as to increase the brightness, the gradation curves of R, G, and B all move toward the upper side in the diagram. However, the output value has an upper limit and therefore the lightness of a displayed image is fixed at the upper limit in an area in which the input values are large. In this case, loss of gradations in highlights tends to occur.

In contrast, when setting is performed so as to decrease the brightness, the gradation curves of R, G, and B all move toward the lower side in the diagram. In this case, the lightness of a displayed image becomes substantially 0 and therefore loss of gradations in shadows tends to occur in an area in which the input values are small.

Next, in the case of contrast, when setting is performed so as to increase the contrast, the gradation curves of R, G, and B all move toward the upper side in the diagram in the range in which the input values are small. In this case, a displayed image has a certain level of lightness even in the case where the input value is close to 0 and therefore display of a black image becomes difficult and a black image tends to be reproduced in a brighter level of black.

In contrast, when setting is performed so as to decrease the contrast, the gradation curves of R, G, and B all move toward the lower side in the diagram in the range in which the input values are small while the gradation curves of R, G, and B all move toward the upper side in the diagram in the range in which the input values are large. In this case, in an area in which the input values are small, the lightness of a displayed image becomes substantially 0 and therefore loss of gradations in shadows tends to occur. In an area in which the input values are large, the lightness of a displayed image is fixed at the upper limit and therefore loss of gradations in highlights tends to occur.

As described above, with hardware adjustment, the gradation characteristic may be degraded in the case where the input values of respective colors of R, G, and B are close to 0 or close to the maximum value (255 in the above case).

In software adjustment, the settable range is wide and fine color adjustment is possible. Furthermore, software adjustment has a merit in that a setting is easily changed. However, with software adjustment, it is difficult to increase the brightness of white color, and software adjustment tends to have a large impact on the gradation characteristic. Therefore, the number of gradations of a displayed image may be decreased.

Figure 4A:
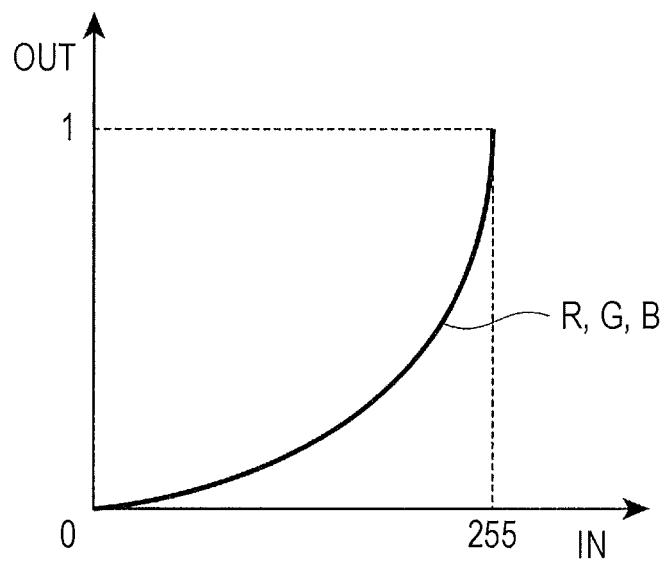
FIGS. 4A and 4B are diagrams illustrating changes in gradation characteristics when color adjustment is performed through software adjustment.
Figure 4B:
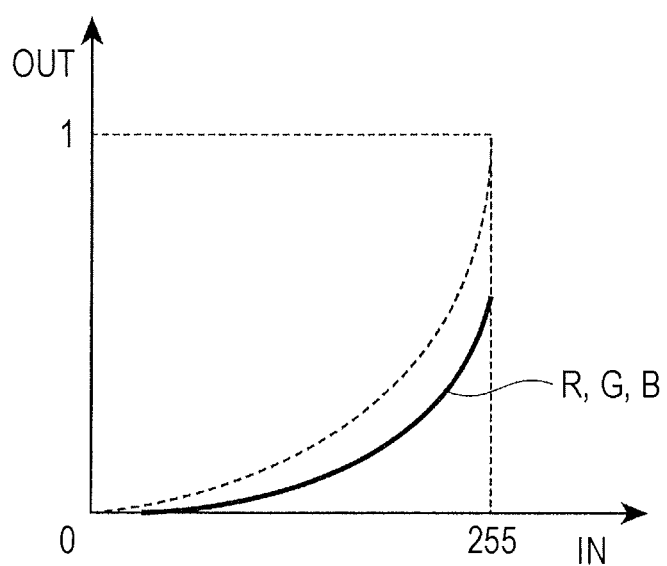

FIGS. 4A and 4B are diagrams illustrating changes in gradation characteristics when color adjustment is performed through software adjustment.

FIG. 4A illustrates the gradation characteristics of respective colors of R, G, and B before color adjustment through software adjustment is performed, which is similar to FIG. 3A.

FIG. 4B illustrates changes in the gradation characteristics of respective colors of R, G, and B when adjustment is performed through software adjustment so as to decrease the brightness.

As illustrated in FIG. 4B, the gradation curves of R, G, and B all move toward the lower side in the diagram. Note that, with software adjustment, the maximum value of the output value is decreased. Therefore, the number of gradations of a displayed image is substantially decreased. The number of gradations is decreased more as the amount of correction made through software adjustment increases.

Accordingly, when the number of gradations of a displayed image is decreased, the image appears to have a gradation jump, or loss of gradations in highlights or loss of gradations in shadows tends to occur.

As described above, hardware adjustment and software adjustment each have merits and drawbacks. Therefore, in order to perform finer color adjustment for the display device 12, it is desirable to perform each of hardware adjustment and software adjustment appropriately.

In hardware adjustment, the gradation characteristic tends to be degraded especially in the case where the input values of respective colors of R, G, and B are close to 0 or close to the maximum value as described above. Accordingly, in this exemplary embodiment, color measurement images used for grasping the gradation characteristic of the display device 12 (hereinafter sometimes referred to as "color measurement images for hardware adjustment") are prepared in addition to color measurement images used for creating a color conversion table (hereinafter sometimes referred to as "color measurement images for software adjustment") and the color measurement images for hardware adjustment are displayed on the display device 12. After hardware adjustment has been performed, the color measurement images for hardware adjustment are measured by the color measuring device 22 and it is determined on the basis of pieces of color data of the color measurement images for hardware adjustment whether or not the gradation characteristic of the display device 12 falls within an allowable range. If the gradation characteristic falls outside an allowable range as a result of determination, hardware adjustment is performed again for the display device 12. When it is confirmed that the gradation characteristic falls within an allowable range, software adjustment is performed. Specifically, the color measurement images for software adjustment are displayed on the display device 12 and the color measurement images for software adjustment are measured by the color measuring device 22. A color conversion table is created on the basis of pieces of color data of these color measurement images. Then color adjustment is performed for the display device 12 by using the color conversion table.

The matter described above is described below in more detail.

Example of Hardware Configuration of Setting PC

In this exemplary embodiment, it is the setting PC 21 that determines whether or not the gradation characteristic falls within an allowable range.

Figure 5:
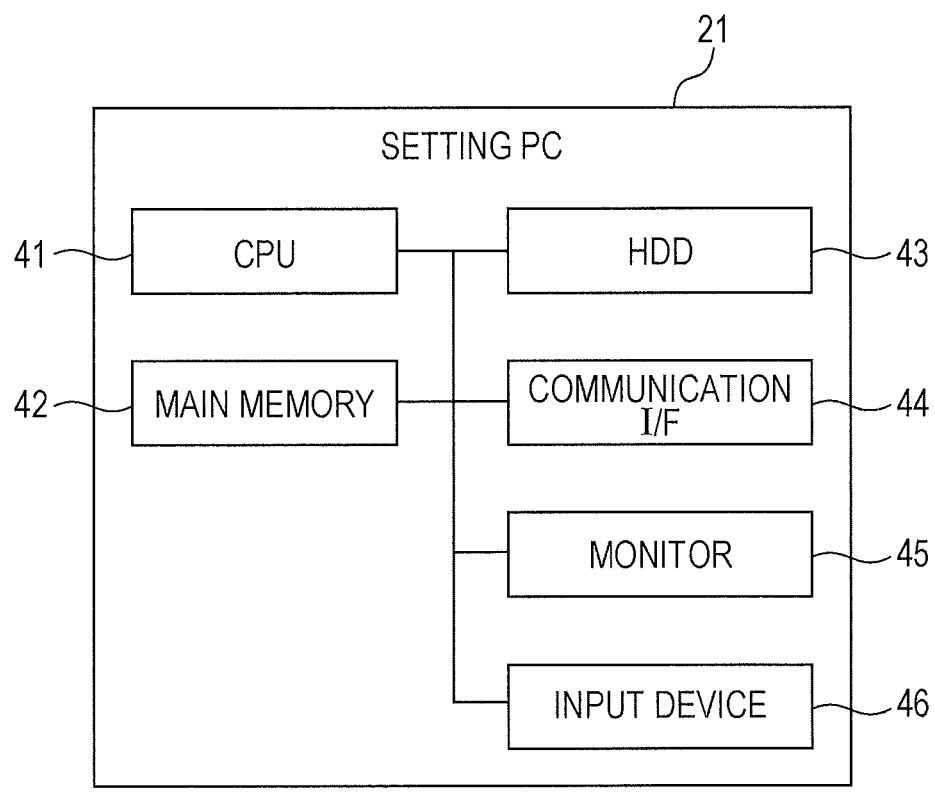
FIG. 5 is a diagram illustrating the hardware configuration of a setting personal computer (PC)

FIG. 5 is a diagram illustrating the hardware configuration of the setting PC 21.

The setting PC 21 is implemented by using a PC or the like as described above. As illustrated in FIG. 5, the setting PC 21 includes a central processing unit (CPU) 41, which is an arithmetic unit, and a main memory 42 and a hard disk drive (HDD) 43, which are memory units. The CPU 41 runs various programs such as an operating system (OS) and application software. The main memory 42 is a memory area in which various programs and data or the like used for execution of the programs are stored. The HDD 43 is a memory area in which data or the like inputted to or outputted from various programs is stored.

The setting PC 21 further includes a communication interface (hereinafter described as a "communication I/F") 44 for performing external communications, a monitor 45 formed of a video memory, a display, and the like, which displays an image, and an input device 46 such as a keyboard, a mouse, or the like.

Example of Functional Configuration of Setting PC

Figure 6:
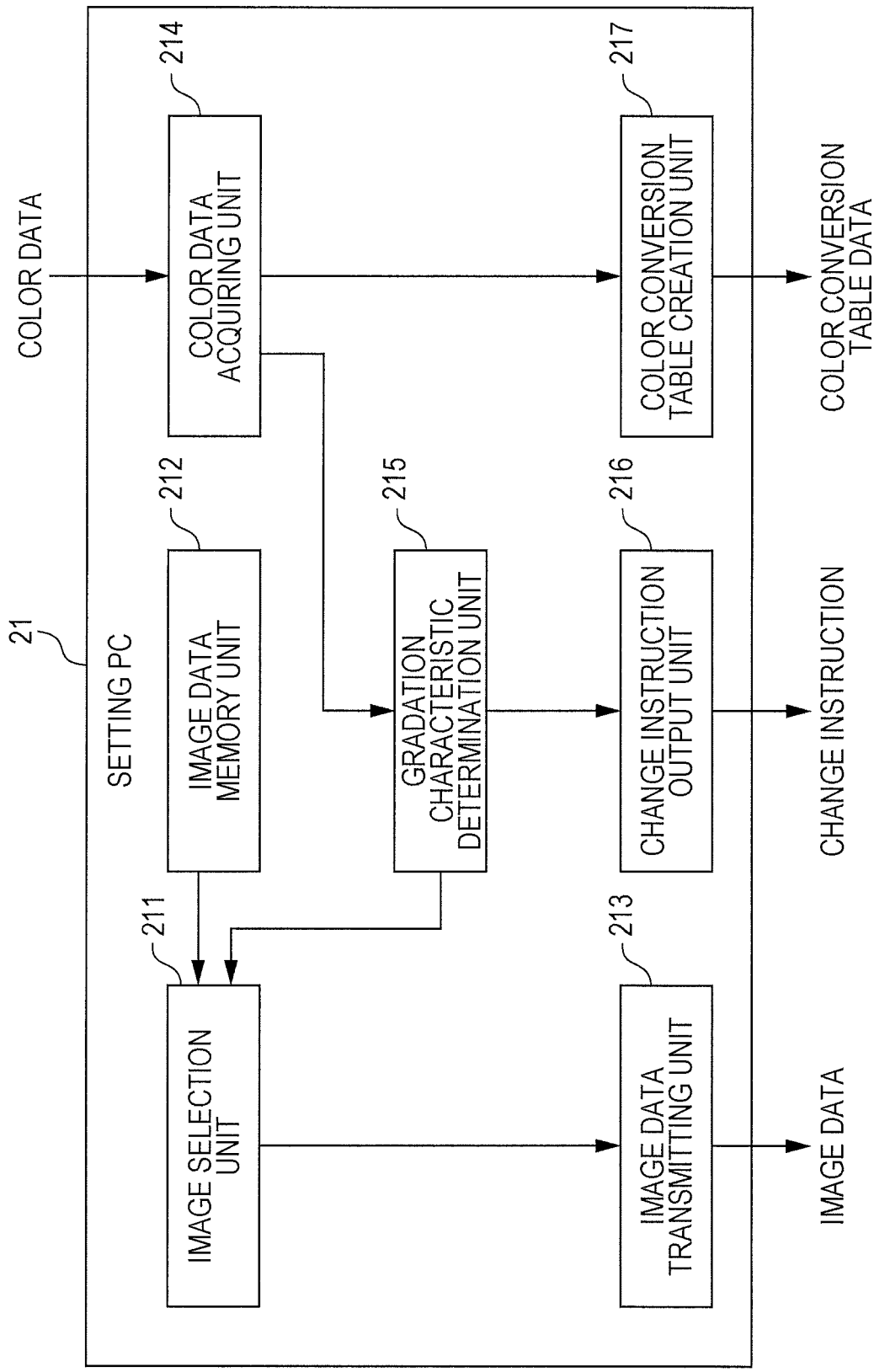
FIG. 6 is a diagram illustrating an example of the functional configuration of the setting PC according to the exemplary embodiment.

FIG. 6 is a diagram illustrating an example of the functional configuration of the setting PC 21 according to this exemplary embodiment.

The illustrated setting PC 21 includes an image selection unit 211, an image data memory unit 212, an image data transmitting unit 213, a color data acquiring unit 214, a gradation characteristic determination unit 215, a change instruction output unit 216, and a color conversion table creation unit 217. The image selection unit 211 selects color measurement images. In the image data memory unit 212, pieces of image data corresponding to color measurement images are stored. The image data transmitting unit 213 transmits pieces of image data corresponding to color measurement images to the display device 12. The color data acquiring unit 214 acquires pieces of color data that have been outputted from the color measuring device 22. The gradation characteristic determination unit 215 determines whether or not the gradation characteristic of the display device 12 falls within an allowable range. The change instruction output unit 216 outputs an instruction to change a setting of hardware adjustment for the display device 12 if the gradation characteristic of the display device 12 does not fall within an allowable range. The color conversion table creation unit 217 creates a color conversion table that is used for performing color conversion processing for the display device 12.

The image selection unit 211 selects color measurement images that are displayed on the display device 12. Pieces of image data corresponding to the color measurement images are stored in the image data memory unit 212 and the image selection unit 211 acquires the pieces of image data corresponding to the selected color measurement images from the image data memory unit 212 and sends the acquired pieces of image data to the image data transmitting unit 213.

As described above, there are two kinds of color measurement images that are selectable by the image selection unit 211. One is a color measurement image for software adjustment that is used for creating a color conversion table by the color conversion table creation unit 217. The other is a color measurement image for hardware adjustment that is used for measuring the gradation characteristic of the display device 12.

The image data transmitting unit 213 is one example of an image information transmitting unit and transmits, to the display device 12, pieces of information (image data) corresponding to color measurement images that are used for performing color adjustment for the display device 12.

On the display device 12, color measurement images are displayed one by one on the basis of the pieces of image data corresponding to color measurement images, which have been transmitted by the image data transmitting unit 213. The colors of the color measurement images displayed on the display device 12 are read by the color measuring device 22. The color measuring device 22 transmits pieces of color information (color data) acquired by reading the color measurement images to the setting PC 21. The pieces of color data outputted by the color measuring device 22 each contain an X value, a Y value, and a Z value in the XYZ color space, or an L* value, an a* value, and a b* value in the L*a*b* color space, for example.

The color data acquiring unit 214 is one example of a color information acquiring unit and acquires the pieces of color data of the color measurement images, which have been transmitted by the color measuring device 22. In the case where a piece of color data has been acquired on the basis of a color measurement image for software adjustment, the piece of color data is sent to the color conversion table creation unit 217. In the case where a piece of color data has been acquired on the basis of a color measurement image for hardware adjustment, the piece of color data is sent to the gradation characteristic determination unit 215.

The gradation characteristic determination unit 215 determines, on the basis of the pieces of color data that have been acquired by the color data acquiring unit 214, whether or not a setting of color adjustment (hardware adjustment) that is performed in the display device 12 satisfies a predetermined gradation characteristic. The specific method for determination is described below.

The change instruction output unit 216 outputs an instruction (change instruction) to change the setting of color adjustment (hardware adjustment) that is performed in the display device 12 if the gradation characteristic determination unit 215 determines that the setting of color adjustment (hardware adjustment) that is performed in the display device 12 does not satisfy the predetermined gradation characteristic.

The change instruction is a warning for notifying a user that the gradation characteristic of the display device 12 does not fall within an allowable range, is outputted in order to notify a user that hardware adjustment needs to be performed, for example, and is displayed on the display screen 121 of the display device 12 or the like. The change instruction may be displayed on the monitor 45 (see FIG. 5) of the setting PC 21.

The color conversion table creation unit 217 creates a color conversion table for the colors of an image that is displayed on the display device 12, on the basis of the pieces of color data that the color data acquiring unit 214 has acquired on the basis of color measurement images for software adjustment.
Description of Method for Determination Performed by Gradation Characteristic Determination Unit Next, the method for determination of the gradation characteristic of the display device 12 that is performed by the gradation characteristic determination unit 215 is described below.

In this exemplary embodiment, in order to grasp the gradation characteristic of the display device 12, at least three kinds of images are prepared as color measurement images for hardware adjustment. Specifically, color measurement images for hardware adjustment include at least three kinds of color measurement images, which are a first color measurement image, a second color measurement image, and a third color measurement image. The first color measurement image has gradation values such that the gradation value of at least one of reference colors used in the display device 12 is set at the maximum gradation value and the gradation values of the remaining reference colors are set to 0. The second color measurement image has gradation values such that the gradation values of all of the reference colors are set to 0. The third color measurement image has gradation values such that the gradation values of the reference colors are each set to a gradation value between the gradation values of the first color measurement image and the gradation values of the second color measurement image and to a gradation value close to the gradation values of the first color measurement image or to the gradation values of the second color measurement image.

Here, the reference colors are colors used for displaying an image on the display device 12 and include three colors of R, G, and B in this case.

The first color measurement image is formed in a saturated color obtained by combining these colors and, in the case where the gradation values are represented by using 8 bits (256 gradations), the gradation value of at least one color from among R, G, and B is 255 and the gradation values of the remaining colors are 0.

Specifically, a color measurement image having the gradation values of (R, G, B)=(255, 255, 255), which represents white color, may be used as a first color measurement image. A color measurement image having the gradation values of (R, G, B)=(255, 0, 0), which represents a saturated color composed of a single color of R, a color measurement image having the gradation values of (R, G, B)=(0, 255, 0), which represents a saturated color composed of a single color of G, or a color measurement image having the gradation values of (R, G, B)=(0, 0, 255), which represents a saturated color composed of a single color of B, may be instead used as the first color measurement image. Furthermore, the first color measurement image may be a color measurement image in which the gradation values of two colors are 255 and the gradation value of the remaining one color is 0, for example, a color measurement image having the gradation values of (R, G, B)=(255, 255, 0).

The second color measurement image has gradation values such that the gradation values of the reference colors are all 0, that is, (R, G, B)=(0, 0, 0), resulting in a black image.

The third color measurement image has an intermediate color relative to the color of the first color measurement image. More specifically, a reference color having the gradation value of 255 in the first color measurement image has an intermediate gradation value between 0 and 255 in the third color measurement image. A reference color having the gradation value of 0 in the first color measurement image has the gradation value of 0 in the third color measurement image. The intermediate gradation value is a value close to 0 or 255.

Specifically, in the case where the first color measurement image has the gradation values of (R, G, B)=(255, 255, 255), which represents white color, the third color measurement image has the gradation values of, for example, (R, G, B)=(240, 240, 240) or (R, G, B)=(32, 32, 32), resulting in a gray image. In the case where the first color measurement image has the gradation values of (R, G, B)=(255, 0, 0), which represents a saturated color composed of a single color of R, the third color measurement image has the gradation values of, for example, (R, G, B)=(240, 0, 0) or (R, G, B)=(32, 0, 0).

Figure 7:
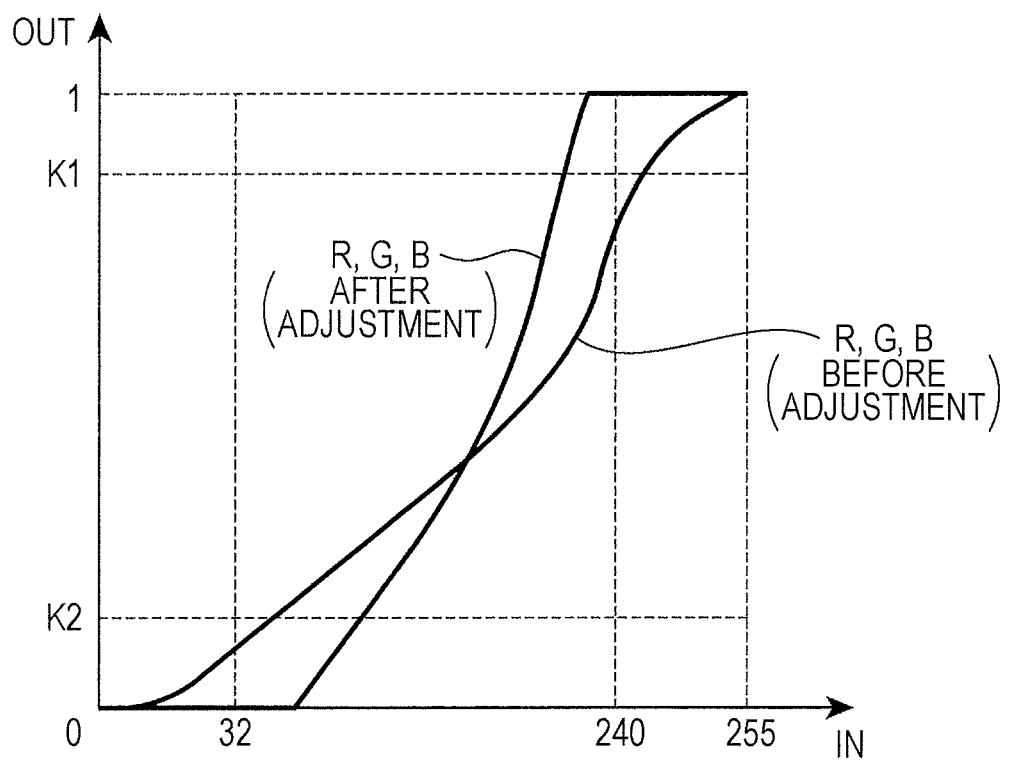
FIG. 7 illustrates a first example of a method for determining the gradation characteristic of a display device.

FIG. 7 illustrates a first example of a method for determining the gradation characteristic of the display device 12.

In FIG. 7, the horizontal axis represents the gradation values of R, G, and B, which are the input values, and the vertical axis represents the output values.

In this exemplary embodiment, a color measurement image having the gradation values of (R, G, B)=(255, 255, 255), which represents white color, is used as a first color measurement image. As a second color measurement image, a color measurement image having the gradation values of (R, G, B)=(0, 0, 0), which represents black color, is used as described above. In FIG. 7, the gradation curve before hardware adjustment is performed and the gradation curve after hardware adjustment has been performed are illustrated as the gradation characteristic of the display device 12.

In the case described above, a first reference value K1 is set in this exemplary embodiment, which is a reference value used in the case where a color measurement image having the gradation values of (R, G, B)=(240, 240, 240) is used as a third color measurement image, for example. In the case where a piece of color data acquired when the color measurement image having the gradation values of (R, G, B)=(240, 240, 240) is used as a third color measurement image is smaller than the first reference value K1, it is determined that the gradation characteristic is good and falls within an allowable range, in the range of around (R, G, B)=(240, 240, 240). Similarly, a second reference value K2 is set, which is a reference value used in the case where a color measurement image having the gradation values of (R, G, B)=(32, 32, 32) is used as a third color measurement image, for example. In the case where a piece of color data acquired when the color measurement image having the gradation values of (R, G, B)=(32, 32, 32) is used as a third color measurement image is larger than the second reference value K2, it is determined that the gradation characteristic is good and falls within an allowable range, in the range of around (R, G, B)=(32, 32, 32).

As described above, in hardware adjustment, the gradation characteristic tends to be degraded in the case where the input values of respective colors of R, G, and B are close to 0 or close to the maximum value. Therefore, in this exemplary embodiment, color measurement images corresponding to these ranges of close to 0 and close to the maximum value are prepared as the third color measurement images and each piece of color data acquired when each of these third color measurement images is measured is compared with the first reference value K1 or the second reference value K2. In this way, it is possible to determine whether or not the gradation characteristic of the display device 12 falls within an allowable range.

By using the method described above, it is possible to determine whether or not loss of gradations in highlights or loss of gradations in shadows described above with reference to FIG. 3B is present. Specifically, in the case where a piece of color data acquired when a color measurement image having the gradation values of (R, G, B)=(240, 240, 240) is used as a third color measurement image, for example, is equal to or larger than the first reference value K1, loss of gradations in highlights is present. In the case where a piece of color data acquired when a color measurement image having the gradation values of (R, G, B)=(32, 32, 32) is used as a third color measurement image, for example, is equal to or smaller than the second reference value K2, loss of gradations in shadows is present.

Note that it is possible to determine whether or not a black image is reproduced in a brighter level of black from a piece of color data acquired when the second color measurement image is measured. Specifically, determination is possible by checking the amount of an increase from 0 in the output value obtained in this case.

Figure 8:
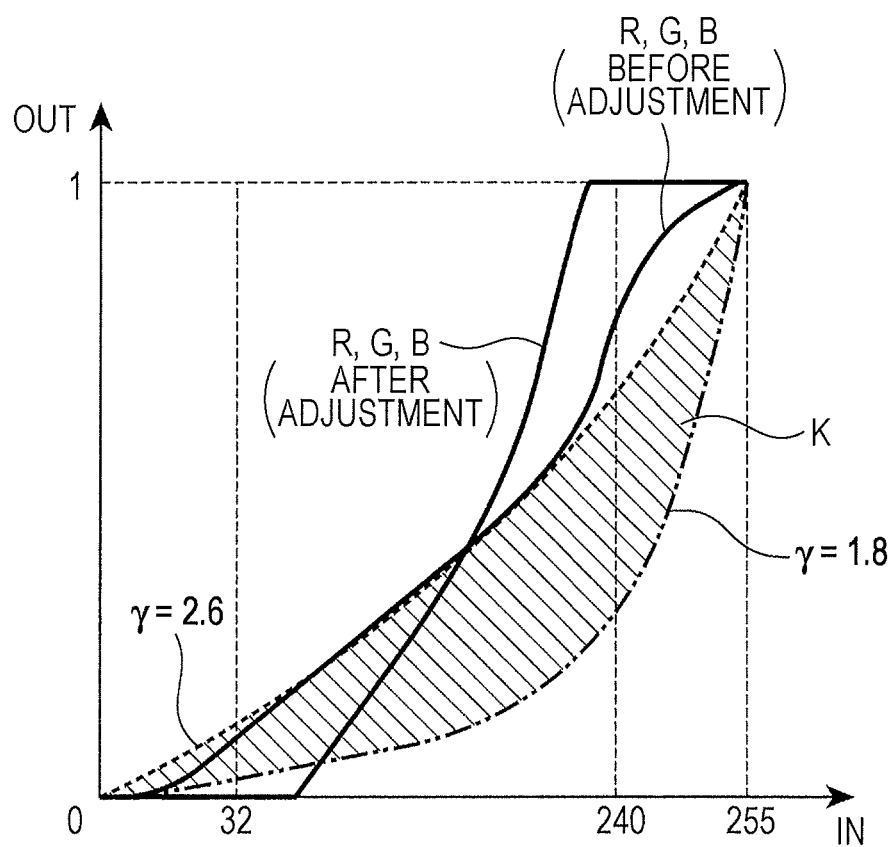
FIG. 8 illustrates a second example of the method for determining the gradation characteristic of the display device.

FIG. 8 illustrates a second example of the method for determining the gradation characteristic of the display device 12.

The first color measurement image, the second color measurement image, and the third color measurement images used in this exemplary embodiment are similar to those described with reference to FIG. 7. In this exemplary embodiment, a range K is specified as a range within which the gradation characteristic of the display device 12 is to fall. It is determined whether or not the gradation characteristic of the display device 12 falls within an allowable range according to whether or not each piece of color data acquired when each of the third color measurement images is measured falls within the range K.

In the case of FIG. 8, the range in which the gradation curve satisfies $1.8 \leq \gamma \leq 2.6$ is specified as an example of the range K. Then it is determined whether or not the gradation characteristic of the display device 12 falls within an allowable range according to whether or not each piece of color data acquired when each of the third color measurement images is measured falls within this range K.

Figure 9:
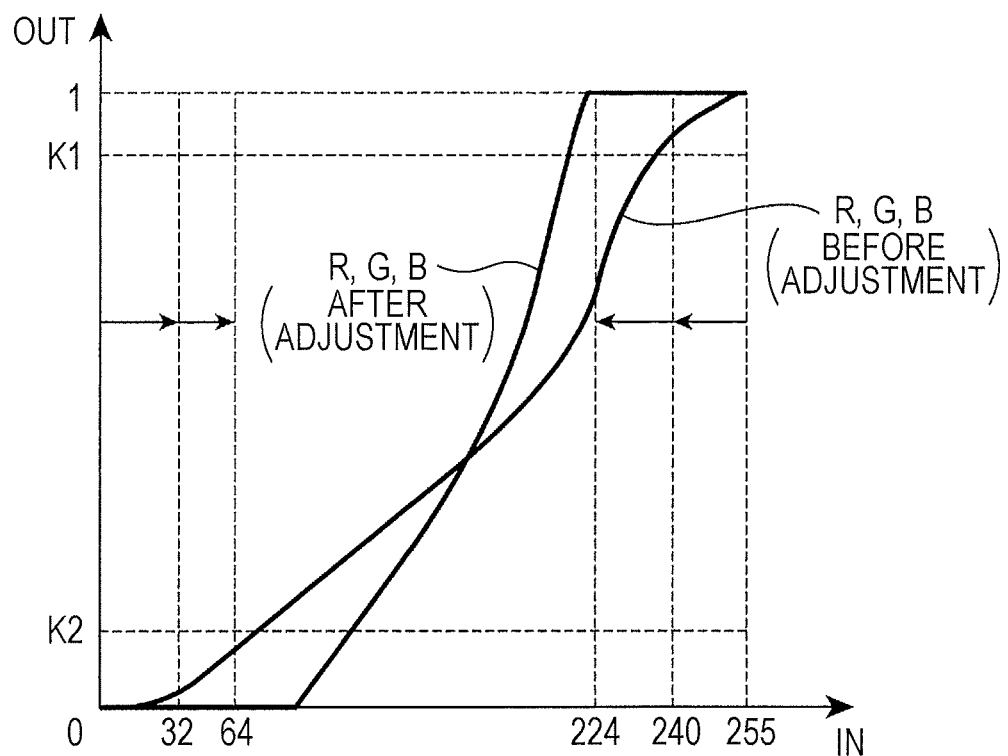
FIG. 9 illustrates a third example of the method for determining the gradation characteristic of the display device.

FIG. 9 illustrates a third example of the method for determining the gradation characteristic of the display device 12.

The first color measurement image and the second color measurement image used in this exemplary embodiment are similar to those described with reference to FIG. 7. As the gradation values of the third color measurement image, the gradation values of (R, G, B)=(240, 240, 240) and gradation values further decreased from (R, G, B)=(240, 240, 240) are selected. For example, a color measurement image having the gradation values of (R, G, B)=(224, 224, 224) is additionally selected as a third color measurement image. Furthermore, as the gradation values of the third color measurement image, the gradation values of (R, G, B)=(32, 32, 32) and gradation values further increased from (R, G, B)=(32, 32, 32) are selected. For example, a color measurement image having the gradation values of (R, G, B)=(64, 64, 64) is additionally selected as a third color measurement image. These third color measurement images are measured and pieces of color data are acquired one by one.

Then each piece of color data acquired when each of the third color measurement images is measured is compared with the first reference value K1 or the second reference value K2.

In this way, a specific range from which the input values are to be selected as the gradation values satisfying the criteria specified by the first reference value K1 and second reference value K2 is known. Furthermore, it is possible to determine whether the gradation characteristic of the display device 12 has been adjusted for the better or for the worse after the hardware adjustment has been performed. For example, suppose that, before hardware adjustment is performed, a piece of color data acquired when the input values are (R, G, B)=(240, 240, 240) does not satisfy the criterion specified by the first reference value K1 but a piece of color data acquired when the input values are (R, G, B)=(224, 224, 224) satisfies the criterion specified by the first reference value K1. If an acquired piece of color data satisfies the criterion specified by the first reference value K1 for both of the input values of (R, G, B)=(240, 240, 240) and (R, G, B)=(224, 224, 224) after hardware adjustment has been performed, it may be determined that the gradation characteristic of the display device 12 has been adjusted for the better. If an acquired piece of color data does not satisfy the criterion specified by the first reference value K1 for either of the input values after hardware adjustment has been performed, it may be determined that the gradation characteristic of the display device 12 has been adjusted for the worse.

Note that, in the example described above, as the third color measurement images, one color measurement image is additionally selected for each of the third color measurement image having the gradation values of (R, G, B)=(240, 240, 240) and the third color measurement image having the gradation values of (R, G, B)=(32, 32, 32). As a matter of course, two or more color measurement images may be additionally selected for each of these third color measurement images. For example, as the third color measurement images, a color measurement image having the gradation values of (R, G, B)=(192, 192, 192) and a color measurement image having the gradation values of (R, G, B)=(96, 96, 96) may be additionally selected.

Figure 10:
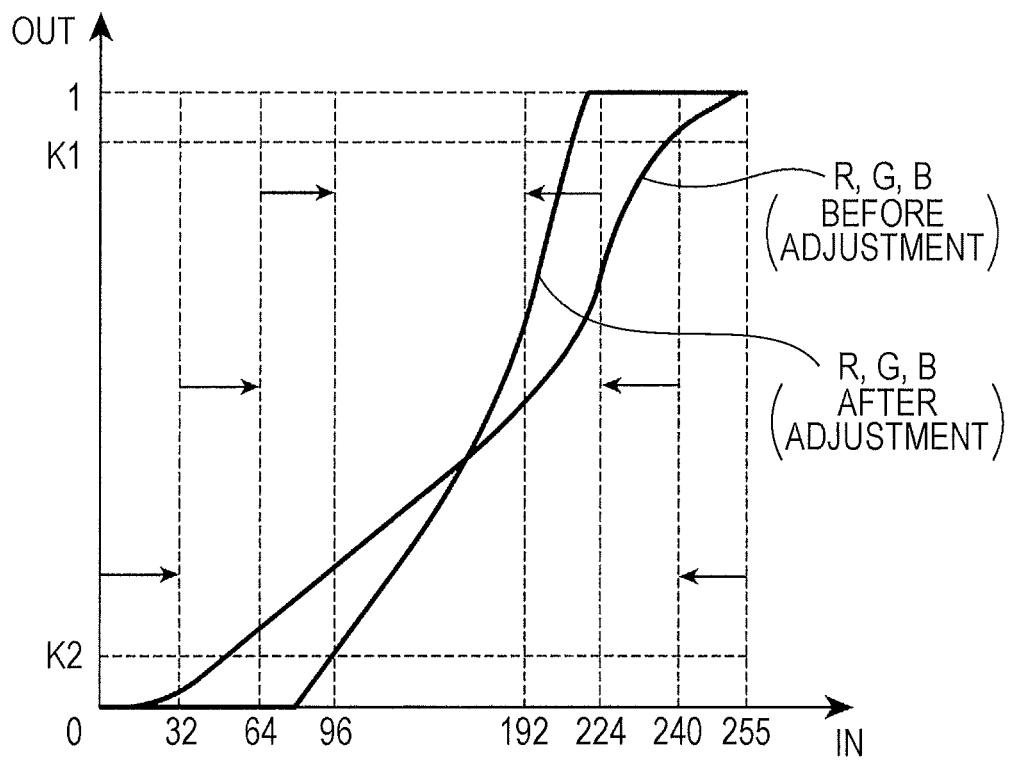
FIG. 10 illustrates a fourth example of the method for determining the gradation characteristic of the display device.

FIG. 10 illustrates a fourth example of the method for determining the gradation characteristic of the display device 12.

In this exemplary embodiment, the gradation values of the third color measurement images are changed in accordance with the brightness of the display device 12. The brightness used here is the brightness of the display device 12 obtained when a white image is displayed on the display device 12, which may be acquired in advance through measurement. Here, in the case where the brightness of the display device 12 is high, for a third color measurement image having the gradation values close to 255, the gradation values are set to be smaller and, for a third color measurement image having the gradation values close to 0, the gradation values are set to be larger. In the case where the brightness of the display device 12 is low, for a third color measurement image having the gradation values close to 255, the gradation values are set to be larger and, for a third color measurement image having the gradation values close to 0, the gradation values are set to be smaller. In other words, the gradation characteristic determination unit 215 changes the criterion for determining whether or not a setting of color adjustment performed in the display device 12 satisfies a predetermined gradation characteristic, in accordance with the brightness of the display device 12 obtained when a white image is displayed on the display device 12.

Specifically, in the case where the brightness of the display device 12 is high, the gradation values of the third color measurement images are set to be (R, G, B)=(192, 192, 192) and (R, G, B)=(96, 96, 96), for example. In the case where the brightness of the display device 12 is intermediate, the gradation values of the third color measurement images are set to be (R, G, B)=(224, 224, 224) and (R, G, B)=(64, 64, 64), for example. In the case where the brightness of the display device 12 is low, the gradation values of the third color measurement images are set to be (R, G, B)=(240, 240, 240) and (R, G, B)=(32, 32, 32), for example.

As described above, in the case where third color measurement images are selected, the criterion of the gradation characteristic desired for the display device 12 is relaxed more as the brightness of the display device 12 increases while the criterion desired for the display device 12 is tighten more as the brightness of the display device 12 decreases. In the case where the brightness of the display device 12 is high, loss of gradations in highlights or loss of gradations in shadows described above does not easily become apparent and therefore the criterion of the gradation characteristic desired for the display device 12 may be relaxed more. In contrast, in the case where the brightness of the display device 12 is low, loss of gradations in highlights or loss of gradations in shadows easily becomes apparent and therefore the criterion of the gradation characteristic desired for the display device 12 needs to be tightened more.

Figure 11:
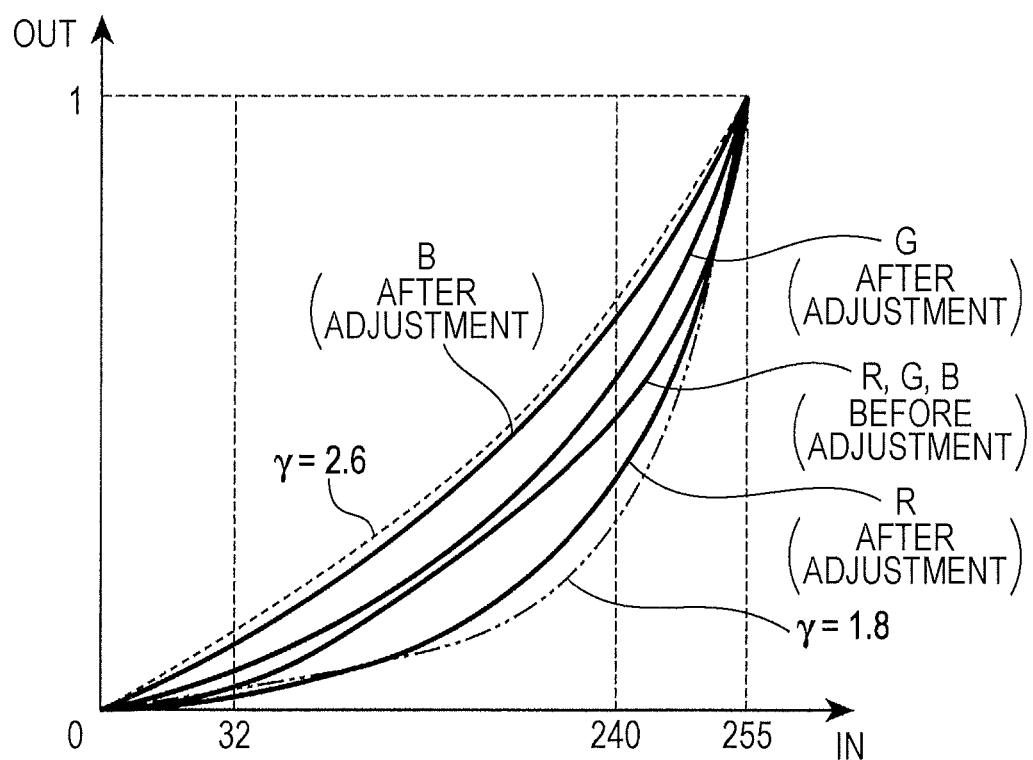
FIG. 11 illustrates a fifth example of the method for determining the gradation characteristic of the display device.

FIG. 11 illustrates a fifth example of the method for determining the gradation characteristic of the display device 12.

In the examples described above, the color measurement image having the gradation values of (R, G, B)=(255, 255, 255), which represents white color, is used as a first color measurement image. In this exemplary embodiment, color measurement images respectively having the gradation values of (R, G, B)=(255, 0, 0), (R, G, B)=(0, 255, 0), and (R, G, B)=(0, 0, 255), which represent respective reference single colors of R, G, and B, are used as first color measurement images. Therefore, for the first color measurement image having the gradation values of (R, G, B)=(255, 0, 0), the gradation values of the third color measurement images are set to be (R, G, B)=(240, 0, 0) and (R, G, B)=(32, 0, 0), for example. For the first color measurement image having the gradation values of (R, G, B)=(0, 255, 0), the gradation values of the third color measurement images are set to be (R, G, B)=(0, 240, 0) and (R, G, B)=(0, 32, 0), for example, and, for the first color measurement image having the gradation values of (R, G, B)=(0, 0, 255), the gradation values of the third color measurement images are set to be (R, G, B)=(0, 0, 240) and (R, G, B)=(0, 0, 32), for example.

As described above, in this exemplary embodiment, a first color measurement image and third color measurement images are selected for each of R, G, and B. Then, on the basis of each piece of color data acquired when each of the third color measurement images is measured, it is determined whether or not the gradation characteristic of each of the colors falls within an allowable range.

In the example of FIG. 11, the range K, which is a range within which the gradation characteristic of the display device 12 is to fall, is specified to be the range that satisfies $1.8 \leq \gamma \leq 2.6$ as in the case of FIG. 8 and it is determined whether or not each piece of color data acquired when each of the third color measurement images of each of the colors falls within the range.

By using this method, it is possible to determine whether or not loss of gradations described with reference to FIG. 3B is present for each of R, G, and B.

Figure 12A:
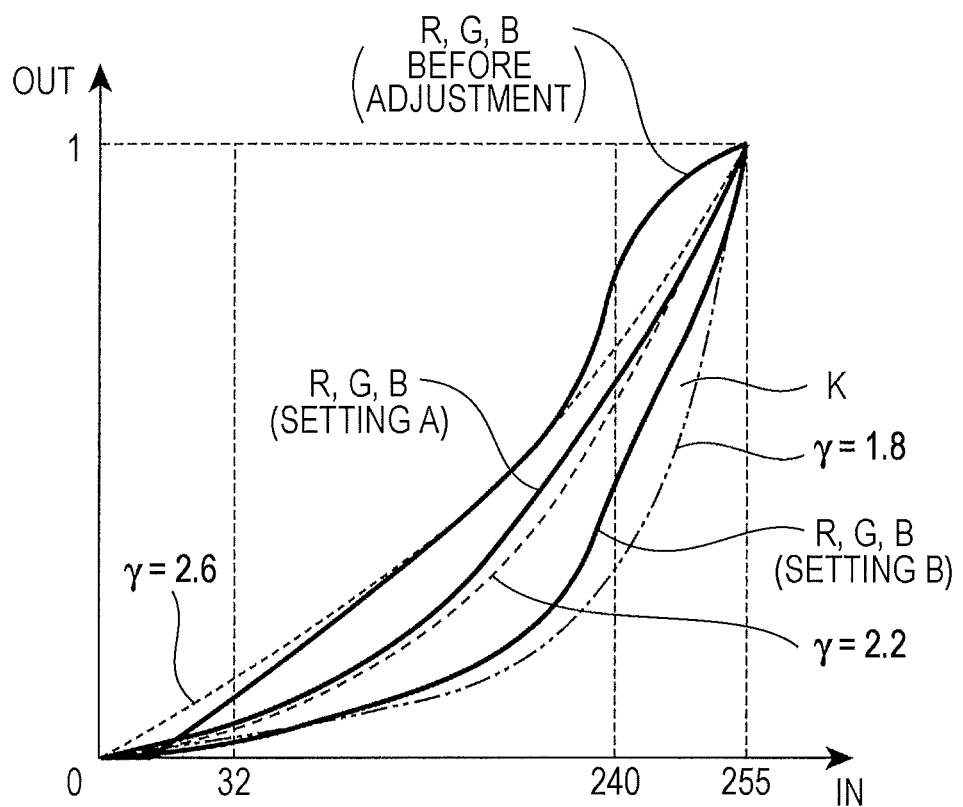

FIGS. 12A and 12B illustrate a sixth example of the method for determining the gradation characteristic of the display device 12.

In the case of hardware adjustment, plural gradation characteristics of the display device 12 may fall within an allowable range as a result of hardware adjustment. In this exemplary embodiment, the method for determining which of the gradation characteristics is adopted in such a case is described.

In FIG. 12A, the range K, which is a range within which the gradation characteristic of the display device 12 is to fall, is specified. FIG. 12A illustrates that there are a setting A and a setting B, the gradation characteristics based thereon falling within the range K as a result of hardware adjustment in which the color temperature and brightness of the display device 12 are adjusted. Note that the gradation curve of $\gamma=2.2$ is also illustrated in FIG. 12A as a reference gradation.

In FIG. 12B, the color temperatures are 5500 K and 6000 K in the setting A and setting B respectively and the differences between the color temperatures and the target temperature, which is 6500 K, are 1000 K and 500 K respectively. Furthermore, in FIG. 12B, the gradation differences, which are the differences between the gradation curves corresponding to the setting A and setting B and the reference gradation, are 0.2 and 0.4 respectively.

In the above case, color temperature weight and gradation weight are set for the color temperature differences and gradation differences respectively. Each of the color temperature differences is multiplied by the color temperature weight and each of the gradation differences is multiplied by the gradation weight and the resulting values are outputted as color temperature scores and gradation scores respectively. In the example of FIG. 12B, the color temperature weight is set to 1/100 while the gradation weight is set to 100. As a result, the color temperature score of the setting A is 10 while the gradation score of the setting A is 20. The color temperature score of the setting B is 5 while the gradation score of the setting B is 40.

The color temperature score and gradation score are added together and the total score is obtained. Then a setting having a smaller total score is adopted. In the example of FIG. 12B, the total score of the setting A is 30 while the total score of the setting B is 45. Therefore, it is decided to adopt the setting A.

In this example, the gradation weight is set to be larger and therefore selection of a setting is made in which the gradation is given more weight than the color temperature. Note that, by adjusting the color temperature weight and gradation weight, it is possible to easily change the one that is given more weight.

As described above, the gradation characteristic determination unit 215 uses pieces of color data from the color data acquiring unit 214 and determines whether or not the gradation characteristic of the display device 12 is good according to whether or not each piece of color data acquired when each of third color measurement images is displayed on the display device 12 falls within a reference range.

In the case where the gradation characteristic determination unit 215 determines that a piece of color data acquired when a third color measurement images is displayed on the display device 12 does not fall within a reference range, the change instruction output unit 216 outputs an instruction to change a setting of color adjustment that is performed in the display device 12.

In the case where the gradation characteristic determination unit 215 determines that each piece of color data acquired when each of the third color measurement images is displayed on the display device 12 falls within a reference range, the color conversion table creation unit 217 creates a color conversion table for the colors of an image that is displayed on the display device 12, on the basis of pieces of color data that the color data acquiring unit 214 has acquired on the basis of color measurement images for software adjustment.

Description of Operations of Setting PC

Figure 13:
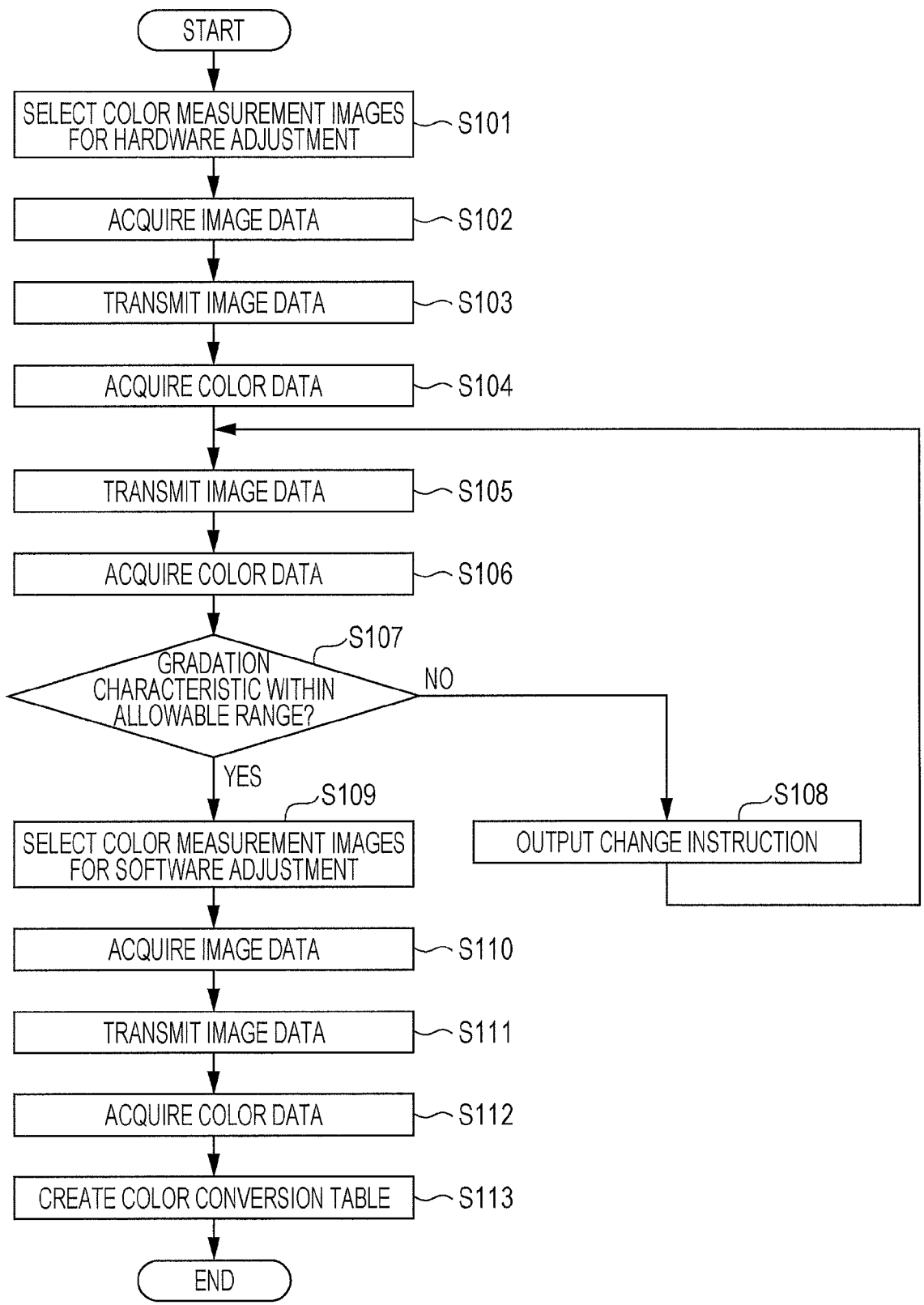
FIG. 13 is a flowchart illustrating a first example of operations performed by the setting PC.

FIG. 13 is a flowchart illustrating a first example of operations performed by the setting PC 21.

The operations performed by the setting PC 21 are described below with reference to FIGS. 6 and 13.

First, the image selection unit 211 selects color measurement images for hardware adjustment (step S101). Next, the image selection unit 211 acquires pieces of image data corresponding to the color measurement images for hardware adjustment from the image data memory unit 212 (step S102). The color measurement images for hardware adjustment include three kinds, which are the first color measurement image, the second color measurement image, and the third color measurement image as described above.

Next, the image data transmitting unit 213 transmits the pieces of image data corresponding to the color measurement images for hardware adjustment that have been selected by the image selection unit 211 to the display device 12 (step S103).

The color measurement images for hardware adjustment are displayed on the display screen 121 of the display device 12 and pieces of color data of the color measurement images for hardware adjustment are acquired by the color measuring device 22. The acquired pieces of color data are transmitted to the setting PC 21.

In the setting PC 21, the color data acquiring unit 214 acquires the transmitted pieces of color data (step S104). In this way, the gradation characteristic of the display device 12 before hardware adjustment is performed may be acquired first.

Next, hardware adjustment is performed by a user. After hardware adjustment has been performed by a user, the image data transmitting unit 213 transmits the pieces of image data corresponding to the color measurement images for hardware adjustment to the display device 12 again (step S105). The color measurement images for hardware adjustment are displayed again on the display screen 121 of the display device 12 and pieces of color data of the color measurement images for hardware adjustment are acquired by the color measuring device 22. Then the color data acquiring unit 214 acquires the pieces of color data (step S106). In this way, the gradation characteristic of the display device 12 after the hardware adjustment has been performed is acquired.

The gradation characteristic determination unit 215 determines whether or not the gradation characteristic of the display device 12 falls within an allowable range (reference range) by using the method described above (step S107). If the gradation characteristic determination unit 215 determines that the gradation characteristic of the display device 12 does not fall within an allowable range (No in step S107), the change instruction output unit 216 outputs a change instruction to change a setting of hardware adjustment (step S108). The change instruction is displayed on the display screen 121 of the display device 12 or on the monitor 45 (see FIG. 5) of the setting PC 21 as described above. Hardware adjustment is performed by a user again in response to the change instruction. That is, the flow returns to step S105.

If the gradation characteristic determination unit 215 determines that the gradation characteristic of the display device 12 falls within an allowable range (Yes in step S107), the image selection unit 211 selects color measurement images for software adjustment (step S109) and acquires pieces of image data corresponding to the color measurement images for software adjustment from the image data memory unit 212 (step S110).

Next, the image data transmitting unit 213 transmits the pieces of image data corresponding to the color measurement images for software adjustment that have been selected by the image selection unit 211 to the display device 12 (step S111).

The color measurement images for software adjustment are displayed on the display screen 121 of the display device 12 and pieces of color data of the color measurement images for software adjustment are acquired by the color measuring device 22. The color data acquiring unit 214 acquires the pieces of color data from the color measuring device 22 (step S112).

The color conversion table creation unit 217 creates a color conversion table that is used for performing color conversion processing for the display device 12, on the basis of the pieces of color data acquired by the color data acquiring unit 214 (step S113). The data of the created color conversion table is outputted from the color conversion table creation unit 217 and stored in the color conversion table memory unit 132 (see FIG. 1) of the color processing apparatus 13.

Figure 14A:
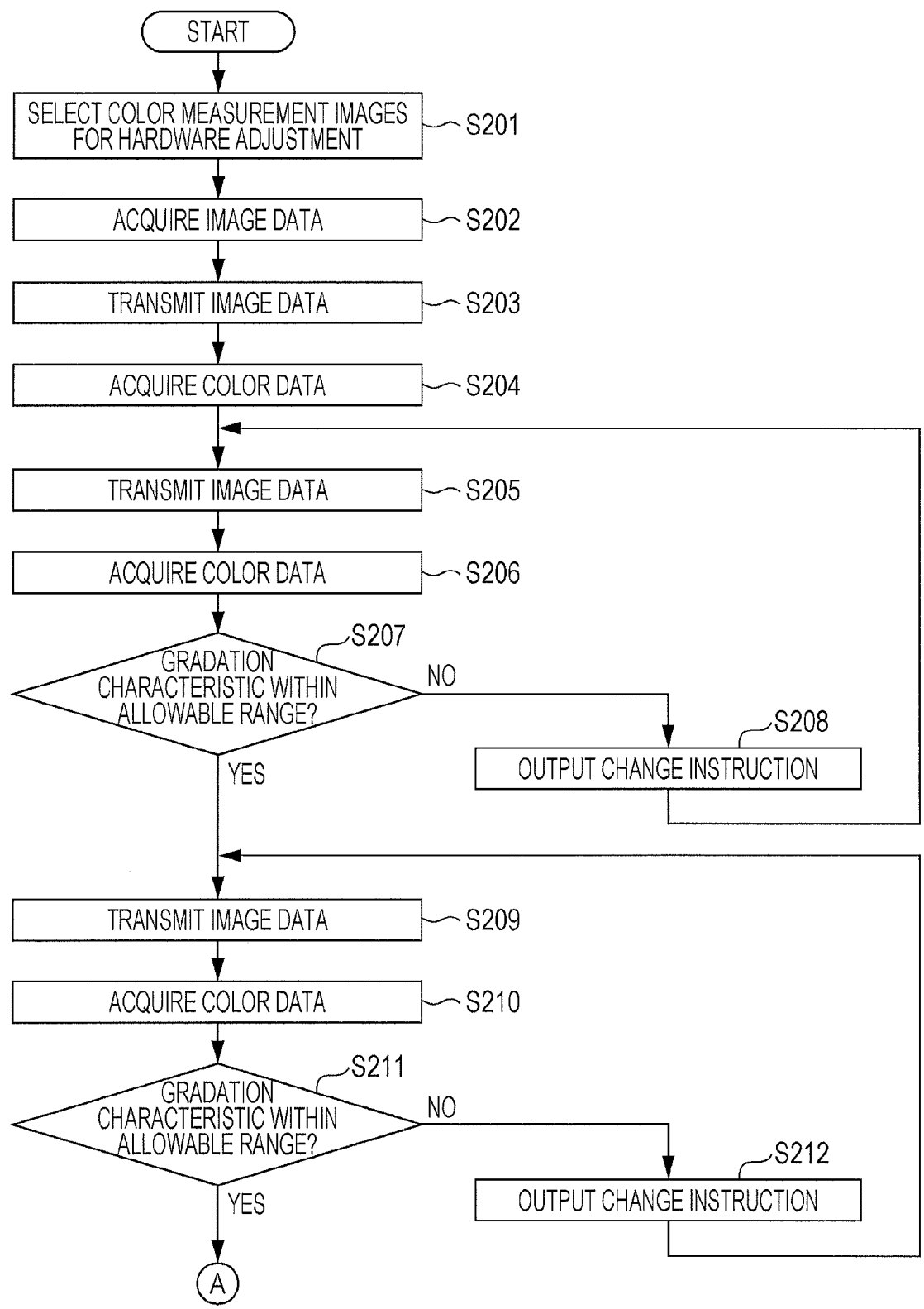
FIGS. 14A and 14B are flowcharts illustrating a second example of the operations performed by the setting PC.
Figure 14B:
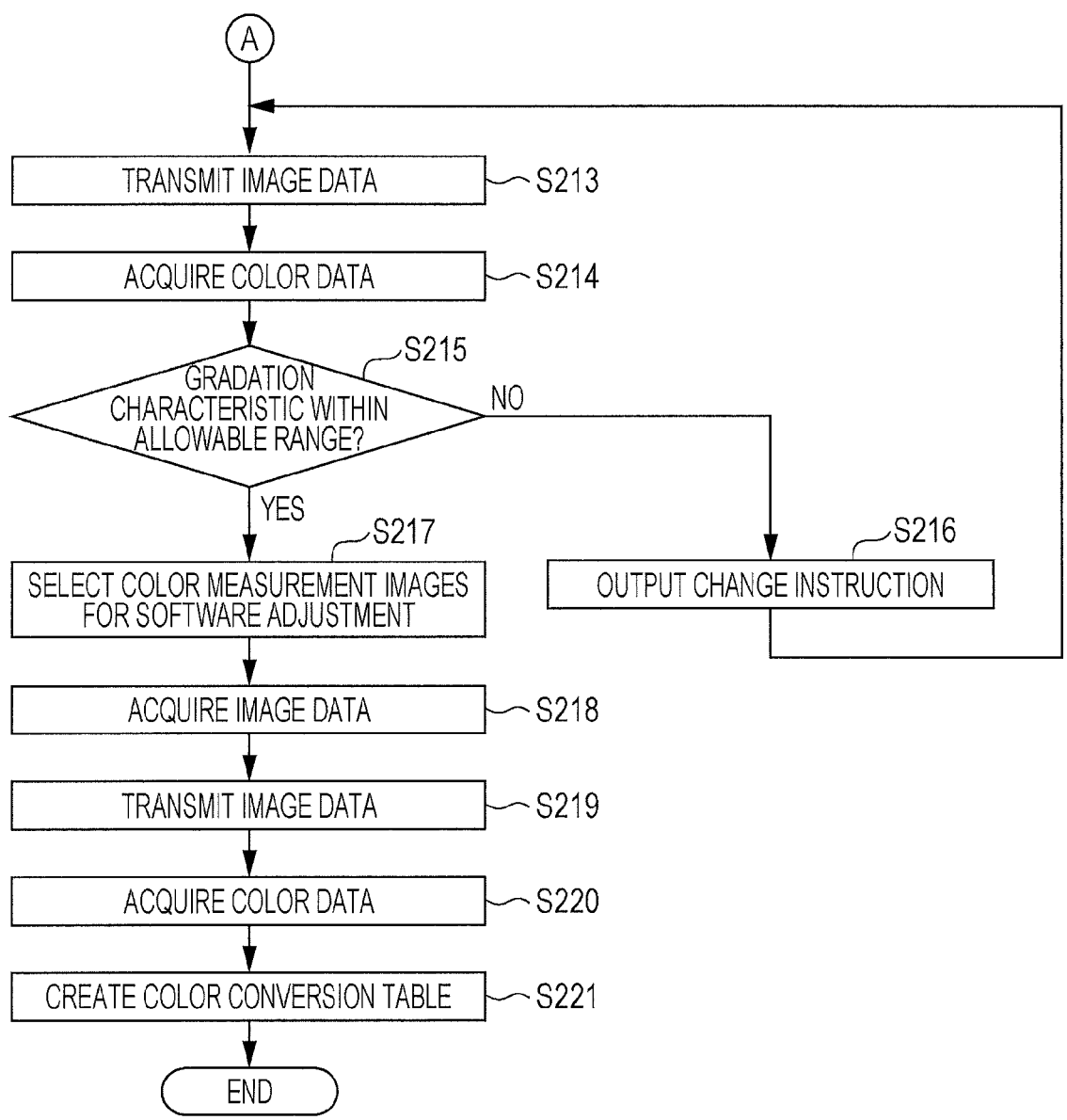

FIGS. 14A and 14B are flowcharts illustrating a second example of the operations performed by the setting PC 21.

The operations performed by the setting PC 21 are described below with reference to FIGS. 6, 14A, and 14B.

In FIG. 14A, the processing performed in steps S201 to S204 is similar to the processing performed in steps S101 to S104 in FIG. 13 and therefore the description thereof is omitted.

Then first hardware adjustment is performed by a user in this exemplary embodiment. The first hardware adjustment is adjustment of the brightness of the display device 12, for example.

The processing performed in steps S205 to S208 is similar to the processing performed in steps S105 to S108 in FIG. 13.

In this exemplary embodiment, if the gradation characteristic determination unit 215 determines that the gradation characteristic of the display device 12 falls within an allowable range (Yes in step S207), second hardware adjustment is performed by a user. The second hardware adjustment is adjustment of the color temperature of the display device 12, for example.

The processing performed in steps S209 to S212 is similar to the processing performed in steps S205 to S208.

In this exemplary embodiment, if the gradation characteristic determination unit 215 determines again that the gradation characteristic of the display device 12 falls within an allowable range (Yes in step S211), first hardware adjustment is performed again by a user. That is, adjustment of the brightness of the display device 12 is performed again, for example.

The processing performed in steps S213 to S216 is similar to the processing performed in steps S205 to S208.

If the gradation characteristic determination unit 215 determines that the gradation characteristic of the display device 12 falls within an allowable range (Yes in step S215), the image selection unit 211 selects color measurement images for software adjustment (step S217).

The following steps S218 to S221 are similar to steps S110 to S113 in FIG. 13.

In the example of FIGS. 14A and 14B, first hardware adjustment is performed again after first hardware adjustment and second hardware adjustment have been performed. Accordingly, finer hardware adjustment may be performed.

In the examples described in detail above, two third color measurement images, such as color measurement images respectively having the gradation values of (R, G, B)=(240, 240, 240) and (R, G, B)=(32, 32, 32), or more are prepared. The third color measurement images are not limited to these and either one of the two may be enough for color adjustment in some cases. For example, in the case of adjusting the color temperature, loss of gradations may occur but loss of gradations in highlights does not tend to occur and therefore the third color measurement image having the gradation values of (R, G, B)=(240, 240, 240) need not be measured. Accordingly, it is enough to measure only the color measurement image having the gradation values of (R, G, B)=(32, 32, 32) as a third color measurement image.

In the examples described in detail above, after hardware adjustment has been performed, software adjustment is performed and a final color conversion table is created, however, the processing is not limited to this. For example, a temporary color conversion table may be created before and after hardware adjustment is performed and whether or not a substantial decrease in the number of gradations occurs may be checked by using the temporary color conversion tables.

Description of Color Adjustment System

The color processing apparatus 13 and the setting PC 21 described above may be together regarded as a color adjustment system. The color adjustment system includes the color processing apparatus 13 and the setting PC 21. The color processing apparatus 13 performs, by using a predetermined color conversion table, color conversion processing on input image data created for display of an image on the display device 12 and outputs the resulting data to the display device 12. The setting PC 21 creates a color conversion table used by the color processing apparatus 13. The setting PC 21 includes the image data transmitting unit 213, the color data acquiring unit 214, the gradation characteristic determination unit 215, and the change instruction output unit 216. The image data transmitting unit 213 transmits, to the display device 12, pieces of image data corresponding to color measurement images that are used for performing color adjustment for the display device 12. The color data acquiring unit 214 acquires pieces of color data of images displayed on the display deice 12 on the basis of the pieces of image data corresponding to color measurement images, which have been transmitted by the image data transmitting unit 213. The gradation characteristic determination unit 215 determines, on the basis of the pieces of color data that have been acquired by the color data acquiring unit 214, whether or not a setting of color adjustment that is performed in the display device 12 satisfies a predetermined gradation characteristic. The change instruction output unit 216 outputs an instruction to change the setting of color adjustment that is performed in the display device 12 if the gradation characteristic determination unit 215 determines that the setting of color adjustment that is performed in the display device 12 does not satisfy the predetermined gradation characteristic.

The display device 12 may be further added to the color adjustment system. In this case, it may be regarded that the display device 12, the color processing apparatus 13, and the setting PC 21 together constitute the color adjustment system.

Description of Program

The processing performed by the setting PC 21 in the exemplary embodiment described above is prepared as a program of application software or the like, for example.

Accordingly, the processing performed by the setting PC 21 may be regarded as a program that causes a computer to implement the function of transmitting, to the display device 12, pieces of image data corresponding to color measurement images that are used for performing color adjustment for the display device 12, the function of acquiring pieces of color data of images displayed on the display device 12 on the basis of the transmitted pieces of image data corresponding to color measurement images, the function of determining, on the basis of the acquired pieces of color data, whether or not a setting of color adjustment that is performed in the display device 12 satisfies a predetermined gradation characteristic, and the function of outputting an instruction to change the setting of color adjustment that is performed in the display device 12 if it is determined that the setting of color adjustment that is performed in the display device 12 does not satisfy the predetermined gradation characteristic.

The processing performed by the setting PC 21 may be regarded as a program that causes a computer to further implement the function of creating a color conversion table for the colors of an image that is displayed on the display device 12 on the basis of pieces of color data that have been acquired if it is determined that the setting of color adjustment that is performed in the display device 12 satisfies the predetermined gradation characteristic.

Note that the program that implements the exemplary embodiments may be, as a matter of course, provided through communications or may be stored in a recording medium, such as a compact disc read-only memory (CD-ROM), and provided therefrom.

While the exemplary embodiments have been described above, the technical scope of the present invention is not limited to the scope described in the exemplary embodiments described above. It is obvious from the description of claims that various modifications and improvements of the exemplary embodiments are also included in the technical scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an image information transmitting unit that transmits, to a display device, pieces of information corresponding to color measurement images that are used for performing color adjustment for the display device;
   a color information acquiring unit that acquires pieces of color information of images displayed on the display device on the basis of the pieces of information corresponding to the color measurement images, which have been transmitted by the image information transmitting unit;
   a gradation characteristic determination unit that determines, on the basis of the pieces of color information that have been acquired by the color information acquiring unit, whether or not a setting of color adjustment that is performed in the display device satisfies a predetermined gradation characteristic; and
   a change instruction output unit that outputs an instruction to change the setting of color adjustment that is performed in the display device in a case where the gradation characteristic determination unit determines that the setting of color adjustment that is performed in the display device does not satisfy the predetermined gradation characteristic.

2. The image processing apparatus according to claim 1, further comprising:
   a conversion relationship creation unit that creates, in a case where the gradation characteristic determination unit determines that the setting of color adjustment that is performed in the display device satisfies the predetermined gradation characteristic, a conversion relationship on colors of an image that is displayed on the display device, on the basis of pieces of color information that have been acquired by the color information acquiring unit.

3. The image processing apparatus according to claim 1, wherein the color measurement images include a first color measurement image that has gradation values such that a gradation value of at least one of reference colors used in the display device is set at a maximum gradation value and gradation values of remaining reference colors are set to 0, a second color measurement image that has gradation values such that gradation values of all of the reference colors are set to 0, and a third color measurement image that has gradation values such that gradation values of the reference colors are each set to a gradation value between the gradation values of the first color measurement image and the gradation values of the second color measurement image and to a gradation value close to the gradation values of the first color measurement image or to the gradation values of the second color measurement image.

4. The image processing apparatus according to claim 2, wherein the color measurement images include a first color measurement image that has gradation values such that a gradation value of at least one of reference colors used in the display device is set at a maximum gradation value and gradation values of remaining reference colors are set to 0, a second color measurement image that has gradation values such that gradation values of all of the reference colors are set to 0, and a third color measurement image that has gradation values such that gradation values of the reference colors are each set to a gradation value between the gradation values of the first color measurement image and the gradation values of the second color measurement image and to a gradation value close to the gradation values of the first color measurement image or to the gradation values of the second color measurement image.

5. The image processing apparatus according to claim 1, wherein the gradation characteristic determination unit changes a criterion for determining whether or not the setting of color adjustment that is performed in the display device satisfies the predetermined gradation characteristic in accordance with brightness of the display device obtained when a white image is displayed on the display device.

6. The image processing apparatus according to claim 2, wherein the gradation characteristic determination unit changes a criterion for determining whether or not the setting of color adjustment that is performed in the display device satisfies the predetermined gradation characteristic in accordance with brightness of the display device obtained when a white image is displayed on the display device.

7. The image processing apparatus according to claim 3, wherein the gradation characteristic determination unit changes a criterion for determining whether or not the setting of color adjustment that is performed in the display device satisfies the predetermined gradation characteristic in accordance with brightness of the display device obtained when a white image is displayed on the display device.

8. The image processing apparatus according to claim 4, wherein the gradation characteristic determination unit changes a criterion for determining whether or not the setting of color adjustment that is performed in the display device satisfies the predetermined gradation characteristic in accordance with brightness of the display device obtained when a white image is displayed on the display device.

9. An image processing apparatus comprising:
   an image information transmitting unit that transmits, to a display device, pieces of information corresponding to color measurement images including a first color measurement image that has gradation values such that a gradation value of at least one of reference colors used in the display device is set at a maximum gradation value and gradation values of remaining reference colors are set to 0, a second color measurement image that has gradation values such that gradation values of all of the reference colors are set to 0, and a third color measurement image that has gradation values such that gradation values of the reference colors are each set to a gradation value between the gradation values of the first color measurement image and the gradation values of the second color measurement image;
   a color information acquiring unit that acquires pieces of color information of images displayed on the display device on the basis of the pieces of information corresponding to the color measurement images, which have been transmitted by the image information transmitting unit;
   a gradation characteristic determination unit that determines, on the basis of the pieces of color information that have been acquired by the color information acquiring unit, whether or not a gradation characteristic of the display device is good according to whether or not a piece of color information acquired when the third color measurement image is displayed on the display device falls within a reference range; and
   a change instruction output unit that outputs an instruction to change a setting of color adjustment that is performed in the display device in a case where the gradation characteristic determination unit determines that the piece of color information acquired when the third color measurement image is displayed on the display device does not fall within the reference range.

10. The image processing apparatus according to claim 9, further comprising:
a conversion relationship creation unit that creates, in a case where the gradation characteristic determination unit determines that the piece of color information acquired when the third color measurement image is displayed on the display device falls within the reference range, a conversion relationship on colors of an image that is displayed on the display device, on the basis of pieces of color information that have been acquired by the color information acquiring unit.

11. A color adjustment system comprising:
a color conversion unit that performs, by using a predetermined conversion relationship, color conversion processing on image information created for displaying an image on a display device and outputs resulting information to the display device; and
a conversion relationship creation unit that creates the conversion relationship used by the color conversion unit, the conversion relationship creation unit including
an image information transmitting unit that transmits, to the display device, pieces of information corresponding to color measurement images that are used for performing color adjustment for the display device,
a color information acquiring unit that acquires pieces of color information of images displayed on the display device on the basis of the pieces of information corresponding to the color measurement images, which have been transmitted by the image information transmitting unit,
a gradation characteristic determination unit that determines, on the basis of the pieces of color information that have been acquired by the color information acquiring unit, whether or not a setting of color adjustment that is performed in the display device satisfies a predetermined gradation characteristic, and
a change instruction output unit that outputs an instruction to change the setting of color adjustment that is performed in the display device in a case where the gradation characteristic determination unit determines that the setting of color adjustment that is performed in the display device does not satisfy the predetermined gradation characteristic.

12. A non-transitory computer readable medium storing a program causing a computer to execute a process for information processing, the process comprising:
transmitting, to a display device, pieces of information corresponding to color measurement images that are used for performing color adjustment for the display device;
acquiring pieces of color information of images displayed on the display device on the basis of the pieces of information corresponding to the color measurement images, which have been transmitted;
determining, on the basis of the pieces of color information that have been acquired, whether or not a setting of color adjustment that is performed in the display device satisfies a predetermined gradation characteristic; and
outputting an instruction to change the setting of color adjustment that is performed in the display device in a case where it is determined that the setting of color adjustment that is performed in the display device does not satisfy the predetermined gradation characteristic.

13. The non-transitory computer readable medium according to claim 12, the process further comprising:
creating, in a case where it is determined that the setting of color adjustment that is performed in the display device satisfies the predetermined gradation characteristic, a conversion relationship on colors of an image that is displayed on the display device, on the basis of pieces of color information that have been acquired.

* * * * *